United States Patent [19]

Torre

[11] Patent Number: 4,877,330

[45] Date of Patent: Oct. 31, 1989

[54] TEMPERATURE SENSING SYSTEM

[75] Inventor: Joseph J. Torre, Kalamazoo, Mich.

[73] Assignee: Pacific Atlantic Products, Ltd., Kalamazoo, Mich.

[21] Appl. No.: 155,069

[22] Filed: Feb. 5, 1988

[51] Int. Cl.⁴ .................... A01K 91/06; G01K 7/00
[52] U.S. Cl. .................................... 374/136; 43/43.15
[58] Field of Search .............. 374/136, 208, 172, 110; 43/4, 27.4, 43.15

[56] References Cited

U.S. PATENT DOCUMENTS

| | | | |
|---|---|---|---|
| 3,031,788 | 5/1962 | Shannon | 43/4 |
| 3,187,576 | 6/1965 | Beeston, Jr. | 374/166 |
| 3,628,274 | 12/1971 | Wojahn | |
| 3,785,079 | 1/1974 | Rohn | |
| 4,000,653 | 1/1977 | Booth et al. | 374/136 |
| 4,047,435 | 9/1977 | Keith | 374/178 |
| 4,050,180 | 9/1977 | King | 242/106 X |
| 4,104,917 | 8/1978 | Rieth et al. | |
| 4,123,698 | 10/1978 | Timko et al. | |
| 4,324,135 | 4/1982 | Peyton | |
| 4,399,695 | 8/1983 | Peyton | |
| 4,403,296 | 9/1983 | Prosky | 374/166 X |
| 4,516,865 | 5/1985 | Hideo | 374/172 |
| 4,685,812 | 8/1987 | Sierpinski et al. | 374/136 X |

Primary Examiner—Daniel M. Yasich
Attorney, Agent, or Firm—Dressler, Goldsmith, Shore, Sutker & Milnamow, Ltd.

[57] ABSTRACT

A temperature detecting system includes a temperature sensor which permits a current to flow whose magnitude is substantially proportional only to the temperature of the sensor. The sensor can be coupled via cables and slip rings to a fixed display unit. The slip rings permit the temperature sensing unit to be located at a desired depth in a fluid for sensing the temperature thereof. The sensed temperature is substantially independent of impedance variations of the slip rings or associated brushes due to wear or corrosion.

26 Claims, 3 Drawing Sheets

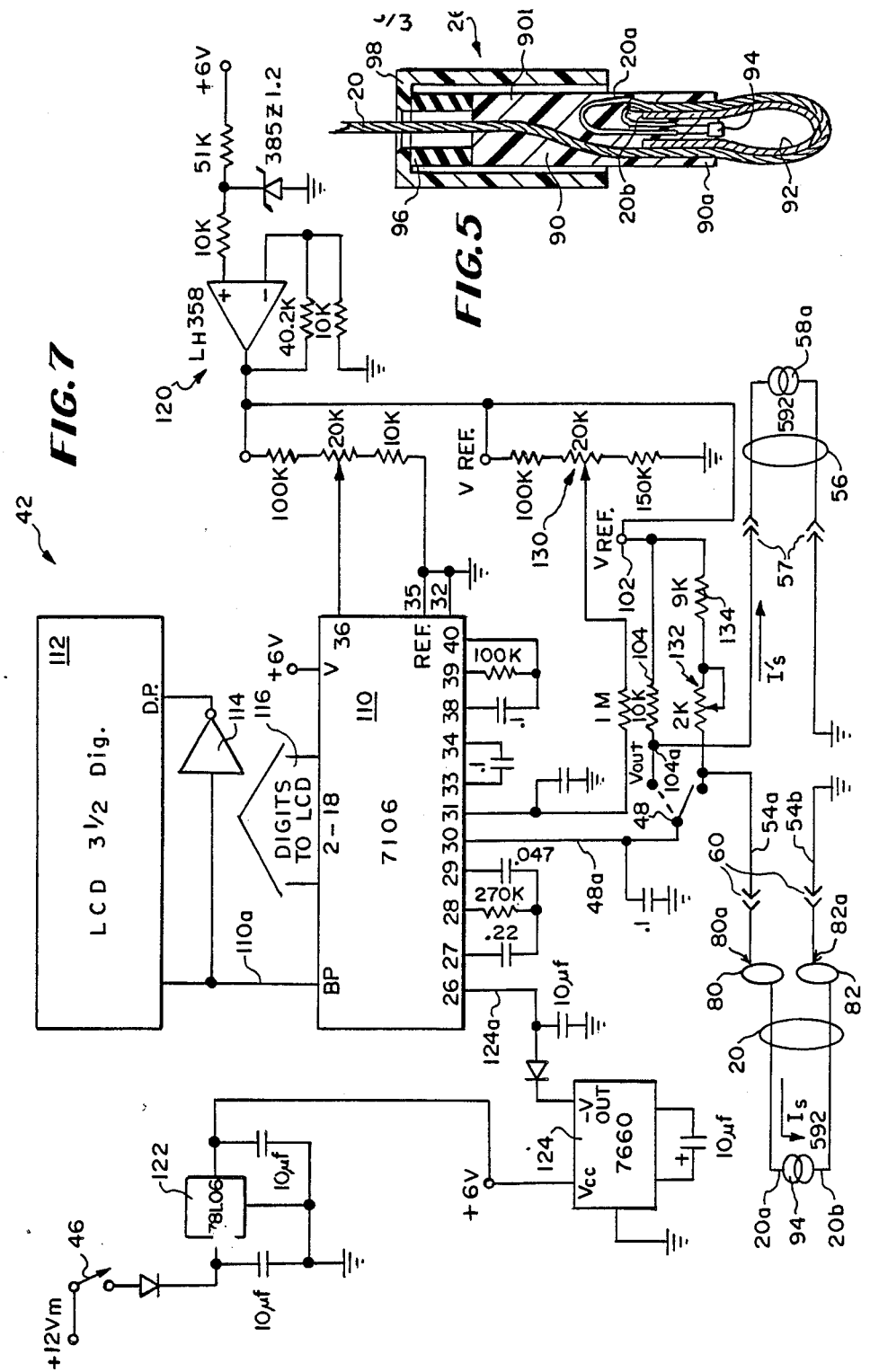

TEMPERATURE SENSING SYSTEM

TECHNICAL FIELD

The present invention relates generally to temperature sensing systems. More particularly the present invention pertains to temperature sensing systems usable to measure water temperature while fishing.

BACKGROUND OF THE INVENTION

It is often desired to determine the ambient temperature of a fluid. A typical system includes a temperature sensor connected to a display unit. One application for such a temperature sensing system would include sport fishing.

To be successful, a fisherman needs to locate the bait or lure in an appropriate region of water to entice the fish to bite. One parameter of effective location of the bait is water temperature. Various species of fish appear to prefer different water temperatures. In an effort to locate the bait near where the desired species of fish might be situated, temperature readings are taken of the water to determine where to place the bait.

The bait is positioned with a boat mounted downrigger. The downrigger includes a frame which rotatably supports a reel which stores and dispenses the downrigger line. A downrigger arm extends from the frame and includes a guide arrangement at its free end for guiding the line from the downrigger reel into and out of the water. A trolling weight or ballast is attached to a free end of the downrigger line.

Fishing line from a fishing rod and reel is attached to an automatic release device carried by the downrigger line. A free end of the fishing line carries a hook and bait or a lure. The downrigger line and release device are lowered into the water so that the fishing line and bait or lure are lowered to the desired depth by the trolling weight.

The boat upon which the downrigger system is mounted is then moved through the water at trolling speeds. The fishing line and bait or lure will trail behind the boat at the desired depth. When a fish strikes the bait or lure, the fishing line is automatically released from the downrigger line. The fisherman then exercises his skill with the fishing rod in order to catch the fish.

Water temperature can be determined in several different ways. A temperature sensing system, separate from the downrigger, could have its own dedicated electrical line. A temperature sensor could be attached to a free end of the electrical line. This electrical line could be reeled out a certain distance. A temperature reading could then be taken. When a satisfactory temperature is found, the downrigger could then be reeled out a similar distance. The bait or lure should then be positioned in water of the desired temperature.

In an effort to improve the accuracy and to avoid duplication, previous systems have combined the temperature sensing system with the downrigger line. In such an arrangement, the sensing device, typically a thermister or a thermocouple, would be located on or near the trolling weight. The downrigger line can also function as an electrical cable and is electrically coupled to the sensing device. That cable is also coupled to an indicator in the boat. The indicator displays the temperature detected by the sensor.

One problem inherent in known systems is that they are designed to operate with a predetermined resistance between the sensor in the water and the indicator in the boat.

This resistance or impedance is due, at least in part, to the electrical cable itself. In addition impedance is due to connectors used to attach the electrical cable to the other members of the system. Typically, one or more slip rings are used to electrically connect the cable to the display. The slip ring or rings allows rotation of the cable but provide for continuous electrical contact between the cable and the indicator. The slip ring or rings can exhibit a variable impedance. Other elements of the system can also exhibit impedance.

Over time in the rugged conditions presented on a fishing boat, especially those experienced while salt water fishing, corrosion occurs and the electrical impedance of at least the slip rings may change. Although calibration can compensate for impedance changes, eventually the system becomes unreliable, and is ineffective for displaying temperature.

Thus, there exists a need for a cost-effective temperature sensing system for use in fishing which includes a temperature sensing device capable of operating substantially independently of electrical resistance in the system or changes in system resistance.

SUMMARY OF THE INVENTION

In accordance with the present invention, a system is provided for detecting the temperature at a first region of a fluid and for indicating the detected temperature at a second region, removed from the first region. Temperature sensing systems in accordance with the present invention are usable in fishing applications.

In such applications, the temperature sensing device would be located beneath the water, in the first region, to determine the depth to position the lure or bait for catching fish. The indicating device or display could be located in a watercraft, the second region.

The present system determines temperature independently of the values of or variations in electrical resistance of the various system components. Independence from resistance values or variations thereof results in greater accuracy in the rugged conditions often found in water applications.

The present temperature sensing system includes a sensor for determining the ambient temperature of the surrounding fluid at the first region. The sensor permits flow of an electrical current proportional essentially only to that temperature. The sensor is positioned in the first region of fluid, such as water.

An elongated conducting cable with proximal and distal ends is coupled to the sensor at the distal end. An indicating device or display is coupled to the proximal end of the conducting cable. The indicating device is located at the second region, remote from the first region of fluid. The temperature dependent current can be detected independently of any changes in impedance in the conducting path. A visual display of the value of the sensed temperature can also be provided.

A system in accordance with the present invention can be used in an application where a boat mounted downrigger is utilized to position bait or a lure to catch fish. The sensor is located near or on the ballast and is surrounded by water. The sensor limits electrical current flow therefrom to an amount directly proportional only to the temperature of the surrounding water.

The sensor is electrically connected through a cable and slip rings to a display or a readout in the boat. The display provides an indicium of the temperature of the water surrounding the sensor The slip rings rotate as the electrical cable is being wound or unwound. Current from the cable passes through a pair of contacts which slide on the slip rings. The contacts are connected to the readout display current detection circuitry.

A particular advantage of the present system is that it operates substantially independently of the values of electrical resistance or resistance variations in the components. All components of the system inherently have resistance. In addition, in a marine environment the present system, especially the slip rings, would be subjected to corrosive elements, such as water, salt and other contaminants. These corrosive elements can affect the electrical impedance of at least the slip rings. Since the temperature can be determined independently of the value of electrical resistance of components found in the system, changes in resistance do not interfere with the system displaying the correct temperature.

The sensor acts as a valve to limit the electrical current in proportion to the temperature of the sensor itself. The sensor is packaged so as to ensure that the ambient temperature of the surrounding fluid is quickly reflected in the temperature of the sensor.

A method is also provided for detecting a temperature at a first region of fluid and for generating a display of the value of the temperature at a second region removed from the first region. The method includes sensing the ambient temperature of a first region of fluid; generating an electrical current proportional to the sensed temperature; conducting the electrical current to the second region; detecting the electrical current and displaying the value of the temperature in the second region.

In an other embodiment, an indicium of the value of the temperature related current can be transmitted between moving and non-moving portions of the system using a light emitting diode or similar device coupled optically to a photodetector. This embodiment is advantageous in that information signal distortions can be to a great extent eliminated by not using the slip rings to conduct such signals.

Numerous other features and advantages of the present invention will become readily apparent from the following detailed description of the invention and embodiment thereof, from the claims and from the accompanying drawings in which like numerals are employed to designate like parts throughout the same.

BRIEF DESCRIPTION OF THE DRAWINGS

FIG. 5 is an enlarged cross-sectional view of a housing for a temperature sensor usable with the system of FIG. 1;

FIG. 7 is a detailed electrical schematic of the temperature sensing system of FIG. 1.

DETAILED DESCRIPTION OF THE PREFERRED EMBODIMENT

Figure 1:
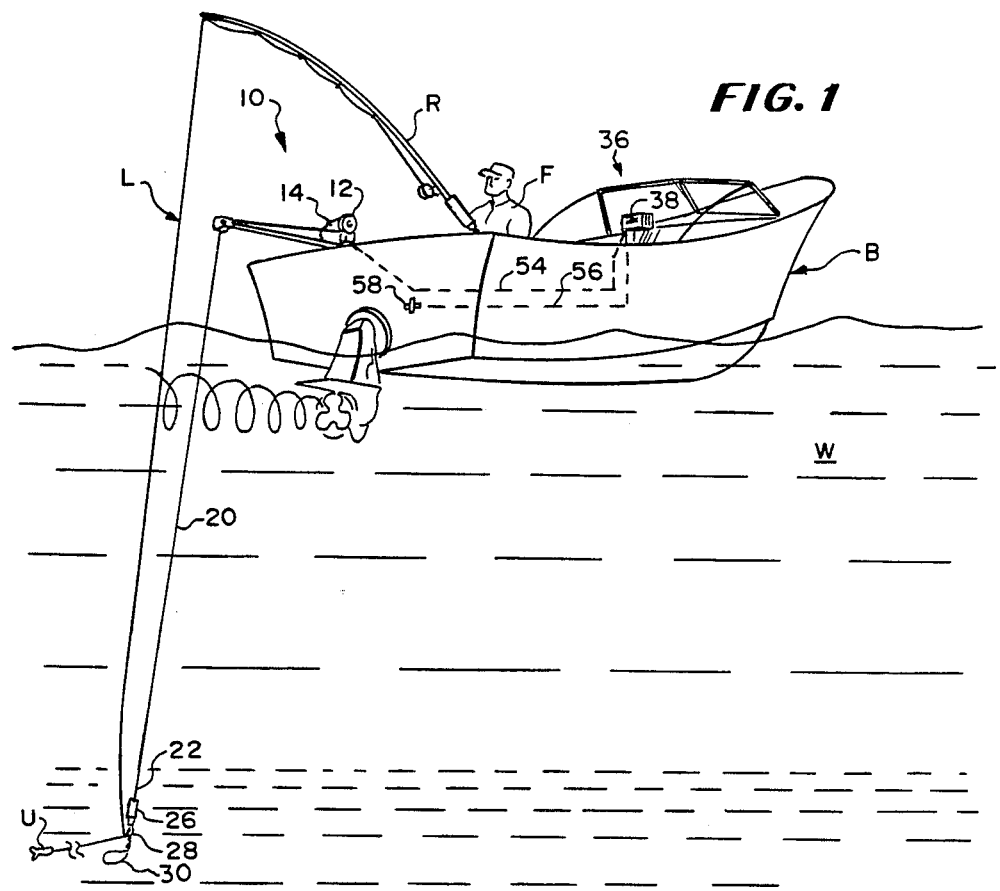
FIG. 1 is a perspective view of a temperature sensing system in accordance with the present invention mounted on a downrigger equipped fishing boat.
Figure 2:
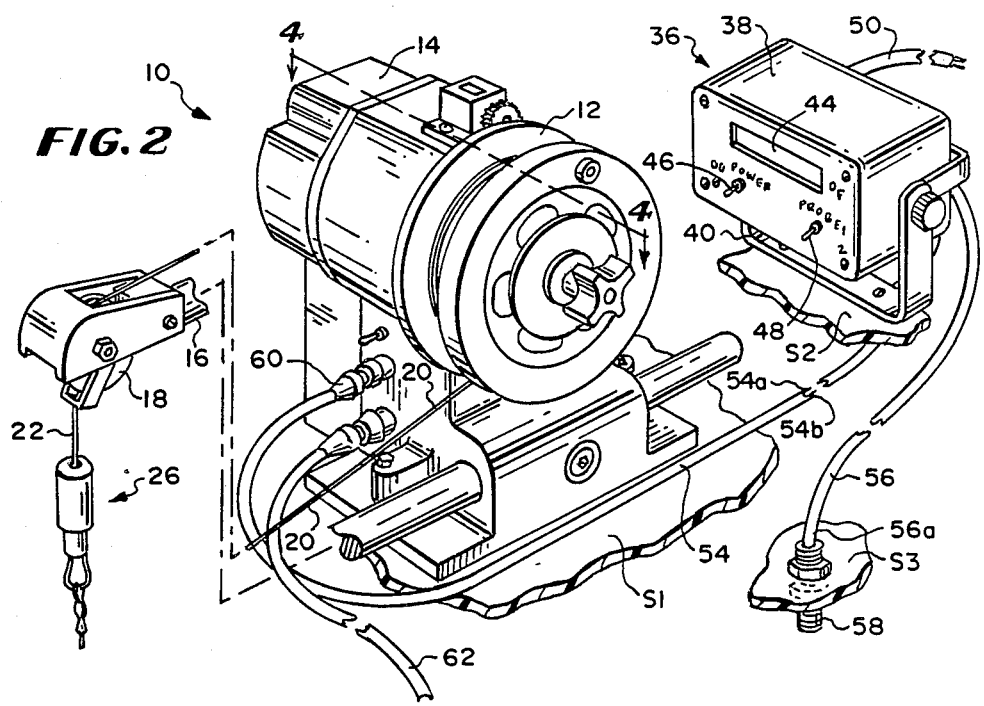
FIG. 2 is an enlarged perspective view of a portion of the downrigger and the temperature sensing system of FIG. 1.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

FIG. 1 illustrates a watercraft such as a fishing boat B. A fisherman F in the fishing boat B is using a rod R with a line L. The line L has a free end to which is attached a lure U.

The boat B is also equipped with a downrigger system generally indicated at 10. The downrigger system 10 includes a reel assembly 12 which is rotatably mounted on a housing 14. Also supported by the housing 14 is an extender arm 16. At a distal end of the extender arm 16 is a guide pulley 18.

A cable 20 is wound around the rotatably mounted reel 12 and extends into the water W. Cable 20 has a free or distal end 22 to which is affixed a housing 26 containing a temperature sensing element (94).

Beneath the housing 26 is a conventional quick release mechanism 28 for the fishing line L. Beneath the quick release mechanism 28 is a trolling weight 30.

It will be understood that an exemplary downrigger system 10 is illustrated herein. However, the exact structure of the downrigger system is not a limitation of the present invention. The downrigger system 10 can be attached to any convenient surface S1 of the boat B.

The downrigger system 10 would be used as is conventional. The trolling weight 30 would be set at a desired depth in the water W by playing out the cable 20. The distal end of the line L, which is releasably attached to the release member 28 will be carried to the desired depth by the trolling weight 30. At this depth the lure U should be appropriately located to attract the desired fish.

The cable 20 can be a two-conductor cable of a type normally used with downrigger systems. It will also be understood that the exact structure of the cable 20 is not a limitation of the present invention.

In addition to the downrigger system 10, the boat B also carries a temperature detecting and display system 36. The system 36 includes a housing 38. The housing 38 can be fixedly attached to a surface S2 of the watercraft or boat B by a bracket 40.

The housing 38 includes a temperature display device 44 which can be a multi-digit seven segment liquid crystal display. The housing 38 also carries an on/off switch 46 and a temperature probe selecting switch 48.

A power cable 50 provides 12 volt DC power to the system 36 from the battery of the boat B. First and second temperature probe cables 54 and 56 are also coupled to the housing 38. The cables 54 and 56 could be removably coupled to the housing 38 using any convenient type of electrical or electronic connector. The cables 54 and 56 are each two conductor cables as illustrated by indicators 54a, 54b of the cable 54.

The cable 56 at a free end 56a is electrically and mechanically coupled to a housing 58. The housing 58 carries a temperature sensor (94) of a type discussed subsequently. The housing 58 can be mounted on a convenient surface S3 of the watercraft B and used for calibration purposes as discussed subsequently.

The cable 54 can be coupled via a connector 60 to the housing 14. The two electrical conductors 54a and 54b of the cable 54 are electrically coupled to a proximal end of one of the two conductors 20a, 20b of the cable 20. A power cable 62 provides 12 volt power to the housing 14 to operate a motor contained therein The motor is used to rotate the reel 12 for the purpose of winding the cable 20 thereon.

Figure 3:
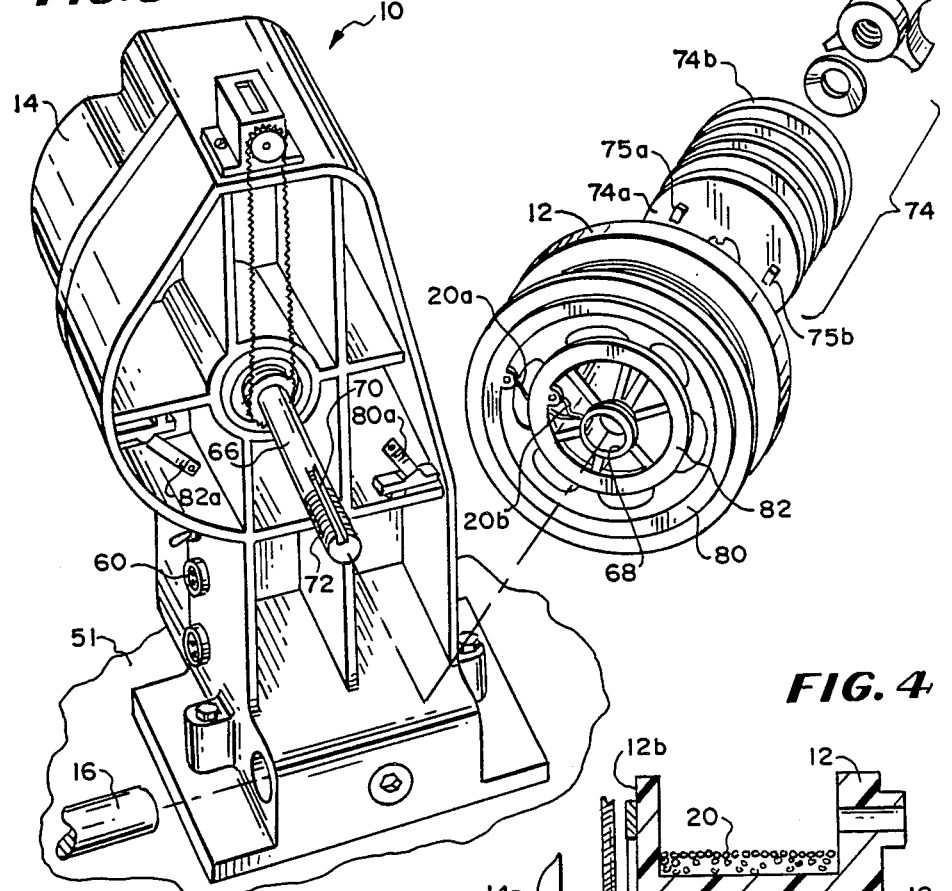
FIG. 3 is an exploded perspective view of the downrigger housing and reel.
Figure 4:
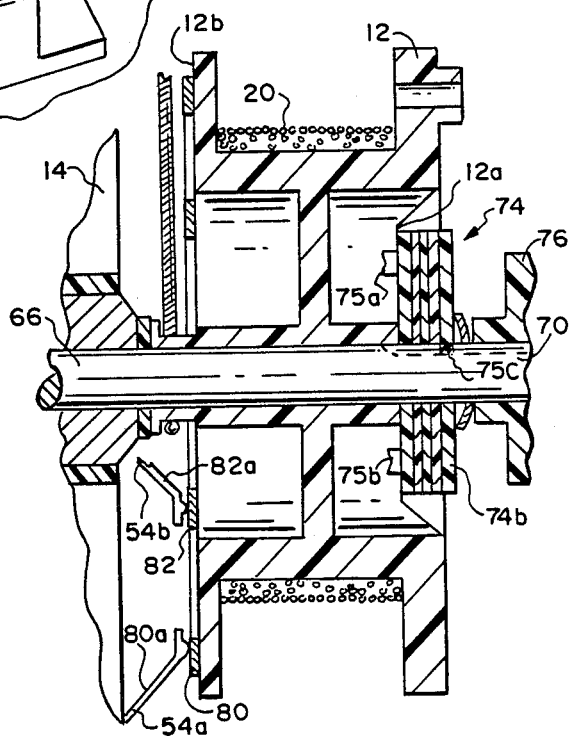
FIG. 4 is an enlarged, fragmentary, cross-sectional view of the downrigger reel taken along plane 4—4 of FIG. 2.

With respect to FIGS. 3 and 4, the cylindrical reel 12 is rotatably supported on a cylindrical elongated shaft 66. The shaft 66 is the output shaft of a motor, perhaps coupled through gears, carried within the housing 14. The reel 12 is slidably received on the shaft 66 via an interior cylindrical bearing surface 68. The output shaft 66 carries an elongated rectangularly shaped slot 70 at a free end thereof. The free end of the shaft 66 also carries threads 72.

The reel 12 can be mechanically locked to the shaft 66 by means of a multielement manually engageable friction clutch 74 which engages a first face 12a of the reel 12. A thread knob 76 which can threadedly engage the thread 72 can apply engaging frictional force to the multielement clutch 74. The clutch 74 in turn bears upon the reel 12.

A plate 74a carries two axially extending flanges 75a and 75b which mechanically engage a surface of the reel 12. A second member 74b of the multielement clutch assembly 74 carries a key 75c which mechanically engages the slot 70.

With the threaded knob 76 advanced toward the reel 12 thereby engaging the clutch member 74, the output shaft 66 of the motor will be locked to the reel 12. The reel 12 can then be rotated by the shaft 66 to wind the cable 20 thereon.

On a second face 12b, displaced from the first face 12a are first and second spaced apart circular slip rings 80 and 82. The slip rings 80 and 82 are formed of any suitable noncorrosive conducting metal As best illustrated in FIG. 4, the cable 20 can be wound around the reel 12.

First and second conductors 20a and 20b of the cable 20 are electrically coupled to the slip rings 80 and 82 respectively. Brushes 80a and 82a, carried by the housing 14, slidably and conductively engage the respective slip rings 80 and 80a. The brush 80a is electrically coupled to the conductor 54a via the two conductor connector 60. The brush 82a is electrically coupled to the conductive member 54b via the two conductor connector 60.

By means of the cooperative interaction between the slip rings 80, 82 and their respective brushes 80a and 82a the conductors 20a and 20b of the cable 20 are continuously placed in electrical contact with the conductors 54a and 54b of the temperature sensing system 36. As the reel 12 rotates on the shaft 66, whether the cable 20 is being unwound so as to lower the trolling weight 30 further into the water W or rewound onto the reel 12 the electrical coupling continues. However, despite the use of corrosion resistant materials for the slip rings 80 and 82 and the brushes 80a and 82a the moisture, in fresh water and the moisture and salt in salt water can affect the electrical impedance therebetween.

FIG. 5 illustrates the mechanical structure of the temperature sensing member 26. The member 26 includes a cylindrical body portion 90. The body portion 90 can be molded of an epoxy compound for strength and water resistance. The cable 20 extends through the molded body portion 90 and exits at a distal end 90a thereof. A metal stress relief 92 is also molded into the body portion 90. The two conductor cable 20 extends around the stress relief 92 and back into the distal end 92a.

Conductors 20a and 20b at the distal end 90a, in the housing 90 are electrically coupled to a temperature sensor 94. The temperature sensor 94 is also molded into the housing 90.

A flexible tubular member 96 is positioned at a proximal end 90b of the housing 90. An outer cover 98, also cylindrical, covers and protects the tubular member 96 and the molded housing 90. The tubular member 96 protects the wire 20 where it enters the proximal end 90b of the housing 90.

The temperature sensor 94 is located at the distal end 90a of the housing 90 so that it is in continuous contact with the surrounding fluid, the water in which the watercraft B is operating. Hence, the temperature of the sensor 94 corresponds to the temperature of the surrounding fluid.

Figure 6:
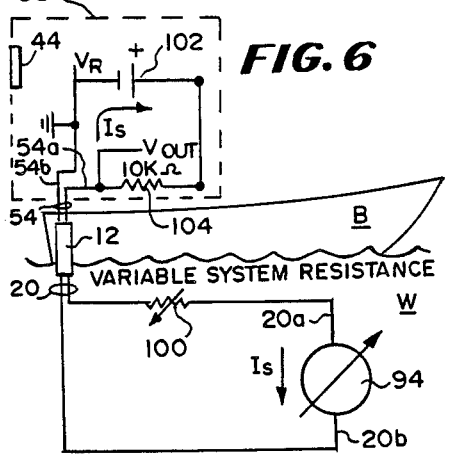
FIG. 6 is an overall schematic diagram of the temperature sensing system of FIG. 1.

FIG. 6 is a simplified electrical schematic of the system 36. The temperature sensor 94 is illustrated coupled to the two conductors 20a and 20b of the cable 20. A variable system impedance 100 is illustrated in the cable 20. It will be understood that the variable system impedance includes that of the cable 20 as well as the slip rings 80, 82 and their respective brushes 80a and 82a. The variable system impedance 100 is illustrated in the cable 20 merely for exemplary purposes. The cable 20 is coupled via the cable 54 to a reference voltage supply 102 and a resistor 104.

The sensor 94 permits a current $I_S$ to flow which is substantially proportional only to the ambient temperature of the sensor 94. The current $I_S$ passing through the 10k ohm resistor 104 generates an output voltage $V_{OUT}$. The output voltage $V_{OUT}$ provides an indication of the temperature adjacent the sensor 94. In view of the fact that the current $I_S$ which the sensor 94 permits to flow is proportional substantially only to the ambient temperature of the sensor, the variable system impedance 100, due to variations in the electrical characteristics of the slip rings 80 and 82, for example, does not affect the output voltage $V_{OUT}$. Hence, the sensed output voltage of $V_{OUT}$ which could be used to then drive a display device, such as the liquid crystal display device 44, will correctly display the ambient temperature of the sensor 94 independent of variations in the impedance 100 of the temperature sensing system.

FIG. 7 is a detailed schematic of the electronics 42 of the temperature sensing system 36. The two temperature sensors 94 and 58a are illustrated respectively coupled to cables 20 and 56. The sensors 94 and 58a could be type AD592 integrated circuits. These sensors act as high impedance temperature dependent current sources of one microamp per degree Kelvin. The conductors 20a and 20b are coupled via the slip rings 80 and 82, respective brushes 80a and 82a and two conductor connector 60 to conductors 54a and 54b of cable 54.

Sensor selector switch 48, a two position switch, is illustrated coupling the sensor 94 to an input of an analog-to-digital converter 110 via a line 48a. The analog-to-digital converter 110 could be implemented as a ICL 7106 integrated circuit. The analog-to-digital converter 110 also includes 7 segment decoders, display drivers, a reference and a clock to drive a 3½ digit liquid crystal display 112. Output from the analog-to-digital converter/display driver 110 on a line 110a, inverted by an inverter 114 provides a continuously displayable decimal point on the display 112. The line 110a also causes the display 112 to continuously display the digits from the analog to digital converter/display driver 110 which are coupled by a plurality of lines 116 to the display 112.

As illustrated in FIG. 7, a reference voltage $V_{REF}$ at a node 102 provides power to the 10k ohm resistor 104. Use of the 10k ohm resistor 104 results in a voltage drop thereacross of 10 millivolts per degree kelvin in response to a current $I_S$ which flows through the sensor 94. When the switch 48 is positioned to couple the sensor 58a to the line 48a, the output voltage generated at a node 104a, is applied via the line 48a to the analog input of the converter 110. The reference voltage, $V_{REF}$, is generated by a temperature stabilizing circuit 120 which includes an LM358 operational amplifier. Input to the temperature stabilizing reference generating circuit 120 is six volts.

The six volts is generated by a voltage regulator 122. The voltage regulator 122 could be a 78L06 integrated circuit. Input to the voltage regulator 122 is 12 volts from the battery of the boat B. A voltage converter 124 converts the regulated 6 volt output from the voltage regulator 122 to a minus 6 volt output. The minus 6 volt output on a line 124a provides an input to the converter/display driver 110.

When the switch 48 is switched to its second position, indicated in phantom in FIG. 7, an output voltage generated at the node 104a is applied to the line 48a and functions as the analog input to the converter/display driver 110. Hence, the sensors 58a and 94 may each be used merely by manually changing the position of the switch 48.

It will be understood that a plurality of temperature sensors, such as the sensors 58a or 94 could be coupled to the converter/display driver 110 by means of switches, comparable to the switch 48, with additional positions. A calibration potentiometer 130 is provided such that the electronic system 42 can be calibrated at a selected temperature point.

To carry out this calibration, the switch 48 is set to its phantom position, the sensor 58a is placed at a known temperature and the potentiometer 130 is adjusted until the display device 112 displays the correct temperature. Subsequently, by means of a potentiometer 132 in series with a 9k ohm resistor give the same readout as the temperature sensor 58a.

In another embodiment, an indicium of the temperature related current can be transmitted between moving and non-moving portions of the system using a light emitting diode or similar device coupled optically to a photodetector. This embodiment is advantageous in that information signal distortions can be to a greater extent eliminated by not using the slip rings to conduct such signals. In such an embodiment, a light emitting diode or similar device coupled optically to a photodetector would be an alternate to the slip rings 80, 82 illustrated in FIG. 7.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system for detecting the temperature at a first region of a fluid and for displaying an indication thereof at a second region, removed from the first region a continuously variable distance, the system comprising:
   sensing means, locatable in the first region, for determining the temperature of the first region of the fluid and for providing an electrical current proportional substantially only thereto;
   flexible, elongated, current conducting means electrically coupled to said sensing means, and extending between the two regions said current conducting means having a variable electrical impedance dependent, at least in part on the continuously variable distance between the two regions and
   display means, coupled to said current conducting means, and positionable at the second region of fluid, for detecting said current independently of any changes in said impedance of said conducting means and for displaying an indication thereof.

2. A temperature detecting system in accordance with claim 1 with the fluid being water, with the second region being outside of the water and wherein said conducting means includes a cable with an exterior conducting shield and an insulated interior conductor with a free end that extends at least into the first region with said sensing means electrically coupled to said free end of said cable.

3. A temperature detecting system in accordance with claim 2, wherein said second region is adjacent a watercraft, the watercraft having a downrigger with a rotatable reel with said cable windable at least in part onto the reel.

4. A temperature detecting system in accordance with claim 2, wherein said cable is a two conductor cable.

5. A temperature detecting system as in claim 4 with said current conducting means including a slip ring for providing a conductive path for said current between said cable and said display means.

6. A temperature detecting system in accordance with claim 2, including means mountable on said boat for reeling and storing said cable.

7. A temperature detecting system as in claim 6 including at least one slip ring carried by said reeling means for electrically coupling said cable to said display means.

8. A temperature detecting system as in claim 7 including means, adjacent said display means, for converting said temperature dependent current to a corresponding voltage.

9. A temperature detecting system as in claim 8 including means for converting said corresponding voltage to a manually viewable temperature indication.

10. A temperature detecting system in accordance with claim 2 wherein said display means includes means for converting said provided temperature dependent current to an optically viewable temperature indicium.

11. A temperature detecting system in accordance with claim 1 wherein said electrical current provided by said sensing means is proportional only to sensed temperature and is essentially independent of variations in total electrical impedance of said conducting means and said display means.

12. A system for detecting the temperature at a selected region of a fluid and for providing an indication thereof at a second region, displaceable a variable distance from the selected region, the system comprising:

elongated, flexible variable impedance current conducting means having first and second portions with a variable electrical impedance therebetween proportional at least in part to the distance between the regions;

indicator means, locatable in the second region and coupled to said first portion of said conducting means, for detecting current flow in said current conducting means and for generating an indication thereof; and detecting means, locatable at the second region and coupled to said second portion of said conducting means, for sensing the temperature of the selected region of fluid and for permitting a current to flow in said conducting means proportional substantially only to the absolute temperature of the region and essentially independent of said variable electrical impedance of said current conducting means between said regions.

13. A temperature sensing system attachable to a watercraft comprising:

mounting means affixable to the watercraft;

a reel rotatably supported by said mounting means;

temperature indicating means, positionable adjacent said mounting means, including means for detecting current flow and for displaying an indication thereof;

an electrical cable windable on said reel with an end unwindable therefrom, said cable having a variable electrical impedance between said end and a region of said cable adjacent said mounting means and including means for coupling said adjacent region to said temperature indicating display with said coupling means having a second electrical impedance; and current limiting means coupled to said end, for providing a current flow in said cable linearly proportional to ambient temperature of said end and substantially independent of any change in said impedances of said cable or said coupling means.

14. A temperature sensing system in accordance with claim 13 where said current limiting means is operative over a temperature range from 0° C. to 105° C.

15. A temperature sensing system as i claim 13 with said coupling means including at least a first slip ring for providing a path for said current between said cable wound on said reel and said display means.

16. A temperature sensing system as in claim 15 with said cable including first and second conductors.

17. A temperature sensing system as in claim 16 with said coupling means including a second slip ring so as to electrically couple said first and second conductors of said cable to said display means.

18. A temperature sensing system as in claim 13 including:

second current limiting means carried by the watercraft; and means for switching said display means between said coupling means and said second current limiting means and including means for adjusting said display means such that said display means can be set to display the same indicator independently of whether said first or said second current limiting means is coupled thereto.

19. A system for sensing temperature in a selected region comprising:

temperature sensing means, having first and second contacts, for providing a current flow between said contacts of a magnitude proportional substantially only to the sensed temperature thereof;

an elongated two conductor cable having a distal end and a proximal end with said two conductors at said distal end electrically coupled to respective of said first and second contacts;

a cylindrical member rotatably carried by means for winding said cable thereonto, said winding means carrying fixedly located connector means with first and second connector members;

means for coupling said two conductors at said proximal end of said cable to said connector means with said coupling means maintaining continuous electrical paths from said first and second connector members, through respective of said cable conductors to said temperature sensing means while said cylindrical member rotates thereby or unwinding said cable therefrom; and means, electrically engaging said coupling means, for displaying an indicator corresponding to said current flow with said displaying means including means for converting said current flow to a corresponding analog output voltage including means for converting said analog output voltage to a corresponding digital electrical representation.

20. A system for sensing temperature in a selected region comprising:

temperature sensing means, having first and second contacts, for providing a current flow between said contacts of a magnitude proportional substantially only to the sensed temperature thereof;

an elongated two conductor cable having a distal end and a proximal end with said two conductors at said distal end electrically coupled to respective of said first and second contacts;

a cylindrical member rotatably carried by means for winding said cable thereonto, said winding means carrying fixedly located connector means with first and second connector members;

means for coupling said two conductors at said proximal end of said cable to said connector means with said coupling means maintaining continuous electrical paths from said first and second connector members, through respective of said cable conductors to said temperature sensing means while said cylindrical member rotates thereby or unwinding said cable therefrom; and means, electrically engaging said coupling means, for displaying an indicator corresponding to said current flow wherein said coupling means includes optical means for transmitting an indicum of said current to said display means.

21. A system for sensing temperature of a selected fluid at a sensing region and for displaying a representation of the sensed temperature at a displaying region, displaced a variable distance from the sensing region, the system comprising:

temperature dependent current source means, locatable in the sensing region, for providing a current flow therethrough of a magnitude proportional substantially only to the sensed temperature thereof;

means, locatable in the displaying region, for displaying a representation of the sensed temperature;

control means coupled to said display means;

variable impedance means for conducting coupled between said current source means and said control means with said conducting means having an impedance variable in accordance with the distance between the sensing region and the displaying region with said control means including means for converting said temperature dependent current to a corresponding electrical representation of temperature; and means for coupling said electrical representation to said displaying means.

22. A temperature sensing system for detecting water temperature in a selected region and for displaying an indicium thereof in display region, outside of the water, with the selected region and the display region spaced apart a variable distance from one another, the system comprising:

elongated conducting means with a portion extendable between said regions;

means for adjusting said extended portion of said conducting means in accordance with the distance between said regions;

means for displaying an indicium of the sensed temperature;

said adjusting means including variable impedance coupling means between said extended portion of said conducting means and said displaying means;

temperature dependent current means, coupled to a part of said conducting means locatable, in the selected region, for generating an electrical current in said extended portion of said conducting means and said coupling means with a magnitude substantially dependent only on the temperature of the water in the selected region; and said displaying means including means for sensing said magnitude of said temperature dependent current and for converting said sensed current magnitude to an indicium displaying electrical signal.

23. A system for sensing temperature of a selected fluid at a sensing region and for displaying a representation of the sensed temperature at a displaying region, displaced a variable distance from the sensing region, the system comprising:

variable impedance conducting means, extendable between the regions and having an impedance variable at least in part in accordance with the distance between the regions;

means, coupled to said conducting means adjacent the displaying region, for displaying a representation of the temperature of the sensing region;

temperature dependent current source means, coupled to said conducting means adjacent the sensing region, for providing a current flow in said conducting means and to said displaying means proportional substantially only to the temperature thereof and essentially independent of said variable impedance.

24. A temperature sensing system as in claim 4 with said displaying means including means for converting said current flow to a corresponding analog output voltage.

25. A temperature sensing system as in claim 24 with said converting means including resistive means.

26. A temperature sensing system as in claim 24 with said displaying means including means for converting said analog output voltage to a corresponding digital electrical representation.

* * * * *

UNITED STATES PATENT AND TRADEMARK OFFICE
CERTIFICATE OF CORRECTION

PATENT NO. : 4,877,330

DATED : October 31, 1989

INVENTOR(S) : Joseph J. Torre

It is certified that error appears in the above-identified patent and that said Letters Patent is hereby corrected as shown below:

Col. 7, line 47, after "9k ohm resistor" insert
-- 134, the temperature sensor 94 can be adjusted to --.

Col. 10, line 52, "indicum" should be -- indicium --.

Col. 12, line 24, "claim 4" should be -- claim 23 --.

Signed and Sealed this

Twenty-fifth Day of December, 1990

Attest:

HARRY F. MANBECK, JR.

*Attesting Officer*      *Commissioner of Patents and Trademarks*